United States Patent
Garney

(10) Patent No.: US 6,349,354 B1
(45) Date of Patent: *Feb. 19, 2002

(54) METHOD TO REDUCE SYSTEM BUS LOAD DUE TO USB BANDWIDTH RECLAMATION

(75) Inventor: John I. Garney, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,924

(22) Filed: Mar. 2, 2000

Related U.S. Application Data

(63) Continuation of application No. 08/740,995, filed on Nov. 6, 1996, now Pat. No. 6,119,190.

(51) Int. Cl.[7] .............................................. G06F 13/00
(52) U.S. Cl. ..................... 710/127; 710/126; 710/58; 710/59; 710/33
(58) Field of Search .............................. 710/31, 32, 33, 710/60, 105, 107, 126–129, 240, 22, 27, 58–59, 61

(56) References Cited

U.S. PATENT DOCUMENTS

| | | | |
|---|---|---|---|
| 5,040,109 A | * | 8/1991 | Bowhill et al. ............... 710/48 |
| 5,463,620 A | * | 10/1995 | Sriram ........................ 370/60 |
| 5,590,378 A | | 12/1996 | Thayer et al. |
| 5,611,071 A | | 3/1997 | Martinez, Jr. |
| 5,621,898 A | | 4/1997 | Wooten |
| 5,625,778 A | | 4/1997 | Childers |
| 5,630,163 A | | 5/1997 | Fung et al. |
| 5,655,138 A | | 8/1997 | Kikinis |
| 5,671,373 A | | 9/1997 | Prouty et al. |
| 5,673,399 A | | 9/1997 | Guthrie et al. |
| 5,717,875 A | | 2/1998 | Cutlerywala et al. |
| 5,721,882 A | | 2/1998 | Singh |
| 5,740,387 A | | 4/1998 | Lambrecht et al. |
| 5,761,461 A | | 6/1998 | Neal et al. |
| 5,761,537 A | | 6/1998 | Sturges et al. |
| 5,764,966 A | | 6/1998 | Mote, Jr. |
| 5,832,300 A | | 11/1998 | Lowthert |
| 5,832,492 A | | 11/1998 | Wooten |
| 5,911,051 A | * | 6/1999 | Carson et al. ............... 710/117 |
| 6,005,613 A | * | 12/1999 | Endsley et al. ............. 348/231 |
| 6,111,896 A | * | 8/2000 | Slattery et al. ............. 370/535 |

* cited by examiner

Primary Examiner—Robert Beausoleil
Assistant Examiner—Raymond N Phan
(74) Attorney, Agent, or Firm—Blakely, Sokoloff, Taylor & Zafman LLP

(57) ABSTRACT

A method and system for reducing system bus load due to bandwidth reclamation on a Universal Serial Bus. A device residing on a USB may not be able to accept or provide data at the maximum rate that such data can move over the USB. In such case, for bulk transfers and control transfers, the transactions are likely to be continually retried because reliable data delivery is guaranteed. This causes a drain on the system bus through put for transactions which cannot complete. By throttling the rate at which transfers to such devices occur, a significant reduction in the load on the system through put bus can be achieved.

11 Claims, 9 Drawing Sheets

| 41 | QH LINK POINTER | 0 | 1 | Q | T |
|---|---|---|---|---|---|
| | DELAY COUNT | 0 | 0 | Q | T |

| 61 | QH LINK POINTER | 1 | 0 | Q | T |
|---|---|---|---|---|---|
| | SKIPQ LINK POINTER | SK CT | RE SK | | |

METHOD TO REDUCE SYSTEM BUS LOAD DUE TO USB BANDWIDTH RECLAMATION

This application is a continuation of U.S. Ser. No. 08/740,995 filed Nov. 6, 1996 U.S. Pat. No. 6,119,190.

BACKGROUND OF THE INVENTION (1) Field of the Invention

The invention relates to bandwidth reclamation on a Universal Serial Bus. More specifically, the invention relates to reducing the system bus throughput load due to universal serial bus bandwidth reclamation.

(2) Related Art

The Universal Serial Bus (USB) is a half duplex single logical wire which permits relatively high speed serial communication between a host system bus and devices on the USB. The USB permits four types of transfers: isochronous transfers, interrupt transfers, control transfers, and bulk transfers.

Isochronous transactions are characterized by a constant fixed data rate between the USB device and the host It is used for devices that continuously consume or produce data at a fixed rate such as microphones or speakers. To support this, the USB guarantees that a required maximum data rate can be transferred in each frame. USB does not require that these transactions occur at this maximum rate in every frame. Failed transactions are not retried. Therefore, the data delivery is not guaranteed in isochronous transactions. Moreover, isochronous data structure elements are always retired after execution.

Interrupt transactions are characterized by small spontaneous transfers from a device. Interrupt transactions are used for devices that require predictable service intervals, but do not produce predictable data flow. Like isochronous transactions, interrupt transactions have a guaranteed maximum data rate. Interrupt transactions are retired after limited retries due to data corruption or other errors.

Control transactions are used to provide a control channel from the host to the USB devices through which control, status, and configuration information may flow. Control transfers always consist of a set-up stage and zero or more data stages followed by a status stage. A stage consists of one or more transactions.

Bulk transactions are characterized by guaranteed transmission of data between client and host under relaxed latency requirements. Bulk transactions are typically used for devices such as printers which can tolerate large latencies, but require movement of large amounts of data. Interrupt, control, and bulk all have guaranteed delivery. Thus, following the data transfer if an acknowledge is not received, the transaction will be retried at the next opportunity.

The USB transfers data in frames. Every frame is one millisecond long and begins with a start of frame packet. The host controller driver can schedule pending transactions with isochronous transactions scheduled first, interrupt transactions next and control and bulk transactions following in turn. USB requires that no more than ninety percent of the frame time be allocated to isochronous and interrupt transactions. Ten percent of each frame must be reserved for control transactions. If, for example, isochronous and interrupt transactions fill up ninety percent of the allocated frame and control transactions fill the remaining ten percent, then no bulk transactions will take place in that frame. Conversely, if during a frame no isochronous transactions are scheduled and no control transactions are pending, bulk transactions are allowed to fill the entire frame. Significantly, if the isochronous and interrupt do not fill their scheduled time, this time may be used for bulk or control transfers. This may occur because scheduling always presumes a worst case transmission characteristic or because there are insufficient transactions of those types to fill the possible 90% allocated. Scheduled transactions which do not follow the worst case profile will result in additional bandwidth available for bulk transactions.

The operations of the USB are generally well known in the art. Architectural details and signaling characteristics are explicitly defined in Universal Serial Bus Specification, Version 1.0, Jan. 19, 1996. Similarly, one possible universal host controller interface (UHCI) is defined for the interface between the USB and a host system bus. Details in that interface are set forth in Universal Host Controller Interface Design Guide, Revision 1.1, March 1996.

Transactions allow data transfer over the USB. Some number of transactions are moved over the bus in each frame. A frame schedule is used by the host controller to determine what specific transactions are moved in what frame. Different implementations of host controllers will require different organization and control of frame schedules. FIG. 1 shows the diagram of an example prior art frame schedule. A hardware register 101 provides a base address, and a frame counter 102 provides an offset to create an address 103 of a frame pointer 104 in a frame list 105. Each entry of the frame list 105 includes two additional relevant bits and two unused bits in addition to a frame pointer. A T-bit 107 is used to indicate whether transactions are pending for the frame. A Q-bit 106 indicates whether a frame pointer points to transaction descriptor (TD) or a queue head (QH).

TDs are data structures containing characteristics of the transaction requested on the USB. Even though four types of transfers exist on the USB, all TDs use the same format. Different transfer types are distinguishable by a number of control bits. QHs are data structures to support control, bulk, and interrupt transactions. Because data is guaranteed to have reliable delivery, such transactions must be queued to facilitate retries in the event a transaction is unsuccessful or, in the case of control and bulk, must be deferred to a subsequent frame. The QH sits at the top of a chain of TDs corresponding to pending transactions of a particular transfer type. The format of a standard prior art QH is shown as element 116. A QH and any associated TDs is a queue context. A QH with no TDs is an empty queue context and is indicated by setting a T-bit of the QH. QHs contain two pointers, a QH link pointer pointing to the next adjacent QH in the schedule and a queue element link pointer pointing to the first TD in the queue.

In executing the frame schedule, the host controller traverses horizontally through the isochronous TDs conducting corresponding transactions. In FIG. 1, frame pointer 104 points to isochronous TD 108, which in turn is linked to the isochronous TD 109, which is linked to isochronous TD 110. To be a valid schedule, all isochronous transactions and any interrupt transactions must be traversed during less than 90% of the frame time (all isochronous and interrupt transactions scheduled must be completed in the frame). Thus, the host controller driver creates the schedule assuming a worst case transmission rate and does not schedule more than the allowable amount of transactions of these types. To achieve this, isochronous TD 110 contains a link pointer pointing to QH 111 corresponding to pending interrupt transactions. Interrupt QH 111 contains an element link pointer pointing to TD 115. The transfer corresponding to TD 115 is completed before the host controller is allowed to follow the QH link pointer of interrupt QH 111 to control QH 112 which in turn points to bulk QH 113. Bulk QH 113 contains a QH link pointer which points to bulk QH 114. Depending on the system and scheduling priority, control transactions can be executed by following QH links or queue element limits such that, e.g. one control transaction is attempted before the next QH in the schedule is traversed or all pending control transactions under a QH are attempted (as time permits) before moving to the next QH. The first example is much more common.

If time is available in the frame after isochronous transactions corresponding to TDs 108–110 and the relevant transactions corresponding to interrupt and non-reclaimable control QHs 111, 112 occur, the remaining time will be used for reclaimable control/bulk transactions, corresponding to the TDs under QHs 113 and 114. This would typically take the form of retrieving QH 113 from main memory identifying TD 123, retrieving TD 123 and, subsequently, the data corresponding to TD 123 from main memory and sending that data across the USB. The QH link pointer is then followed to identify QH 114 which is retrieved from main memory, TD 126 is identified and retrieved from main memory, and the data corresponding thereto is retrieved from main memory and transmitted across the bus. QH 114 links back to QH 113 via its QH link pointer. Traversal of QHs continues following the QH link pointer until there is insufficient frame time for another transaction or no TDs remain.

FIG. 2 is a flowchart of how bulk and reclaimable control transactions proceed in a prior art system. At functional block 130, a QH is read from memory. To do this read, the host controller must arbitrate for the system bus and be granted access. The host controller then processes the QH read to extract the element link pointer of the first TD from QH, at functional block 131. The host controller must then arbitrate for the system bus to read the TD from main memory at functional block 132. From the retrieved TD, the host controller extracts the data address field to identify a block of data to be sent over the USB at functional block 133.

At functional block 134, that block of data is read from main memory once the host controller again arbitrates for the system bus and is granted access. The data is stored in FIFOs in the host controller. At functional block 135, the data is transmitted across the USB to the device. If the data transmission is successful, a handshake acknowledge is returned by the device to the host controller. Thus, at decision block 136, a determination is made whether the acknowledge has been received. If an acknowledge had been received, the element link pointer in the QH is advanced to point to the next TD in the queue. If the acknowledge has not been received, the QH element link pointer is not advanced, and it continues to point to the first TD in the queue at the time the attempted transaction was initiated.

A determination is made at, decision block 138, whether there is sufficient time for an additional transfer attempt If there is insufficient time for an additional transfer attempt, no more attempts will be made until the next frame. Otherwise, at functional block 139, the QH link pointer is extracted to identify the next QH to be read. The host controller arbitrates for the bus and reads the QH (this will be either the next QH in line, if there are any, or assuming a single bulk queue context, the same QH previously read will be re-read). Assuming a case in which a maximum data size for bulk transfers is 64 bytes, approximately eighteen such transfers can occur in an otherwise empty frame. This implies at least 72 arbitrations for the system bus with roughly 2 MB of bandwidth devoted to transactions supporting the USB. In many cases, a USB device's ability to supply or consume data will be less than the host controller's ability to supply or accept data. These slow devices cause numerous retries because of the inability to match the speed of the host controller, e.g., a slow device may only be able to accept 10 kilobytes. The effect is that significant amount of system bus bandwidth is squandered on transactions which have no chance of completion.

In view of the foregoing, it would be desirable to be able to throttle the attempts of the host controller to supply data to a slow device to more closely match the speed at which the device is able to consume or provide data.

BRIEF SUMMARY OF THE INVENTION

A method and system for reducing system bus load due to bandwidth reclamation on a Universal Serial Bus is disclosed. A device residing on a USB may not be able to accept or provide data at the maximum rate that such data can move over the USB. In such case, for bulk transfers and control transfers, the transactions are likely to be continually retried because reliable data delivery is guaranteed. This causes a drain on the system bus for transactions which cannot complete due to a slow device. By throttling the rate at which transfers to such devices occur, a significant reduction in the load on the system bus can be achieved.

In one embodiment, the throttling takes the form of introducing a dummy transaction into the frame schedule. The delay transaction uses the system bus more efficiently and reduces the drain caused by retrying failed transfers in the prior art. In another embodiment, the throttle is caused by inserting a dummy data structure containing a count value into the frame schedule. In this embodiment, the host controller is effectively delayed for the duration of the count. In this manner, load on the system bus related to failed transactions can be minimized.

BRIEF DESCRIPTION OF THE DRAWINGS

FIG. 9 shows exemplary formats of delay and skip queue heads for one embodiment of the invention.

DETAILED DESCRIPTION OF THE INVENTION

Figure 1:
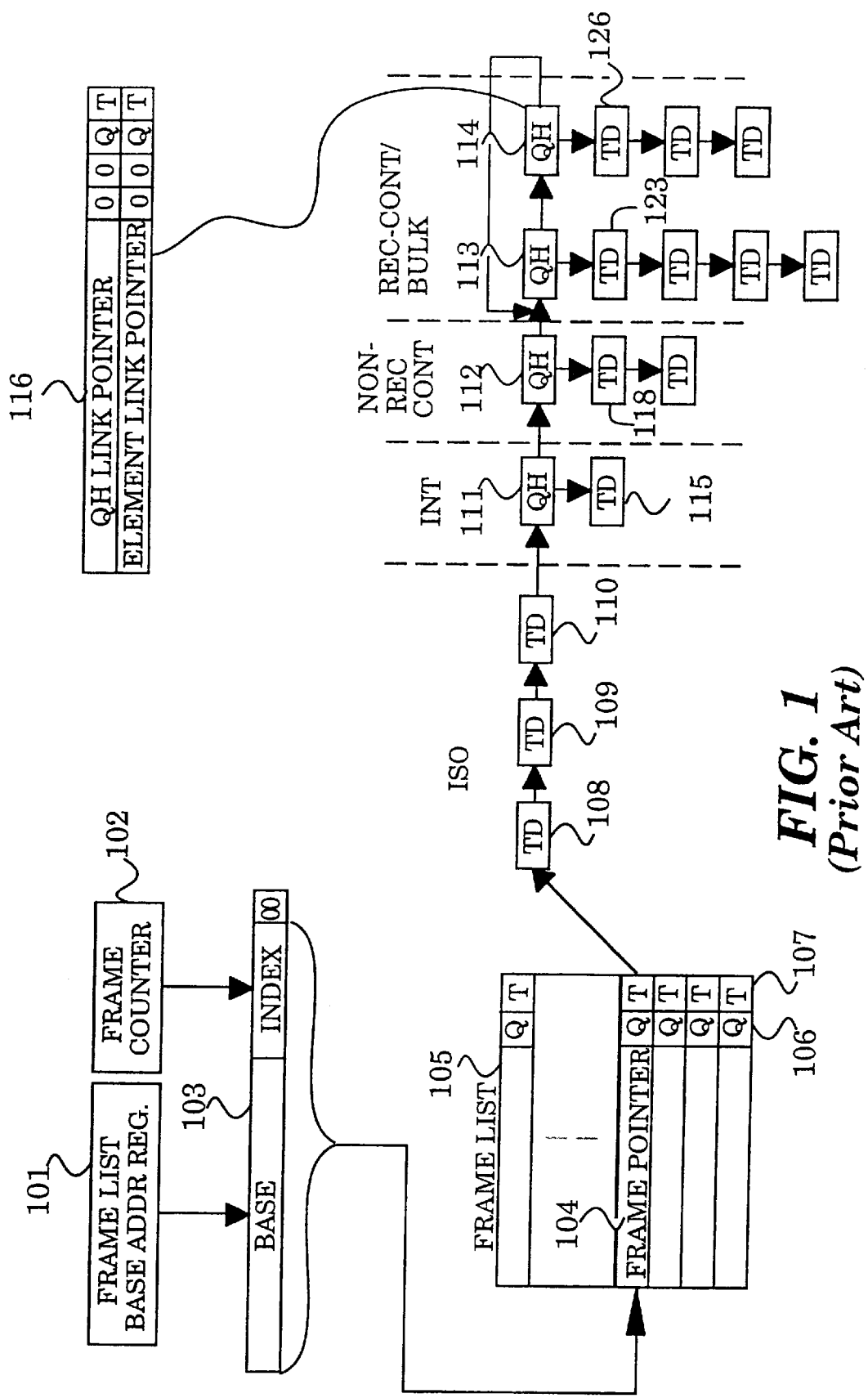
FIG. 1 shows a diagram of a prior art frame schedule.
Figure 2:
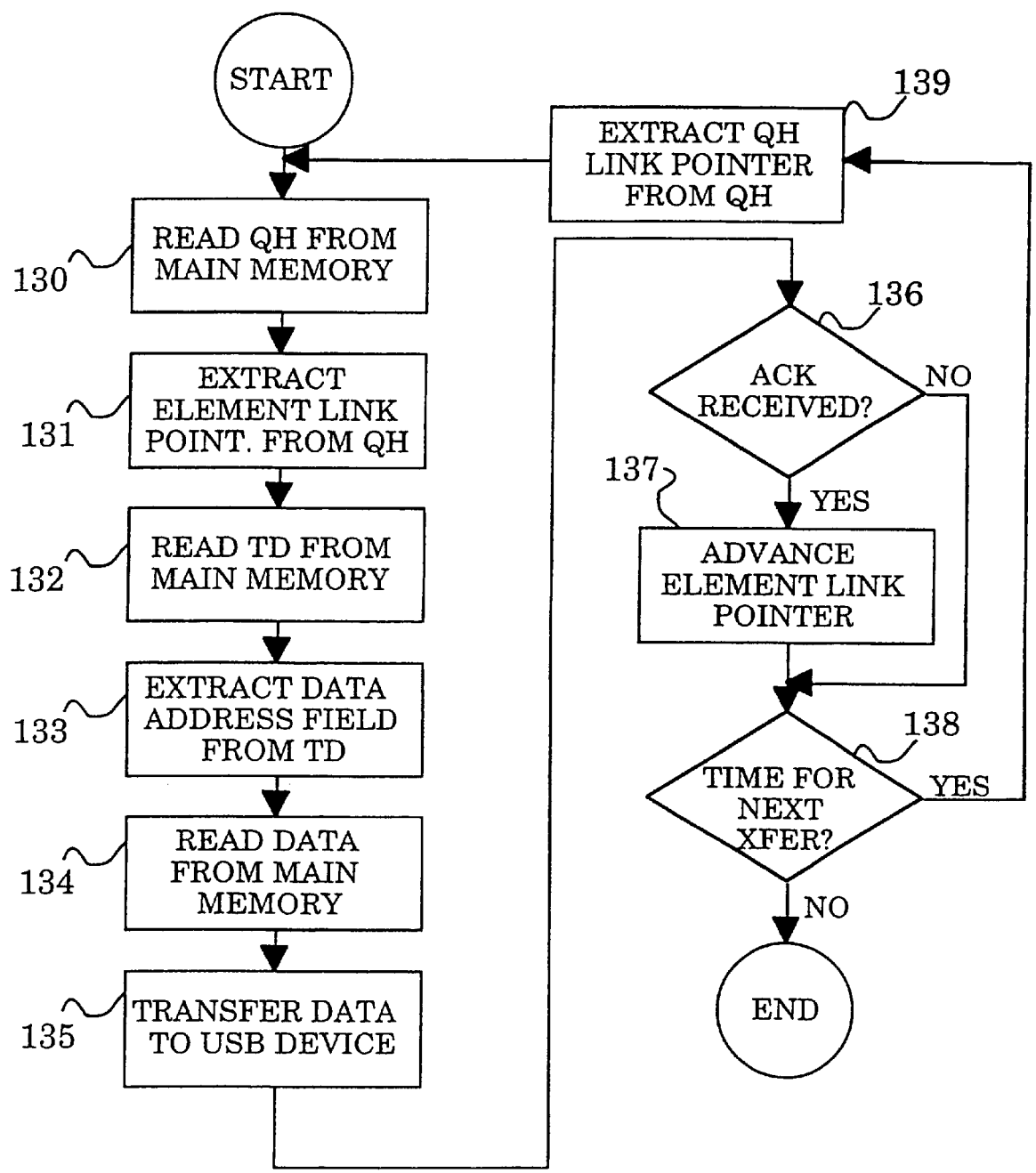
FIG. 2 shows a flowchart of a prior art bulk transfer.
Figure 3:
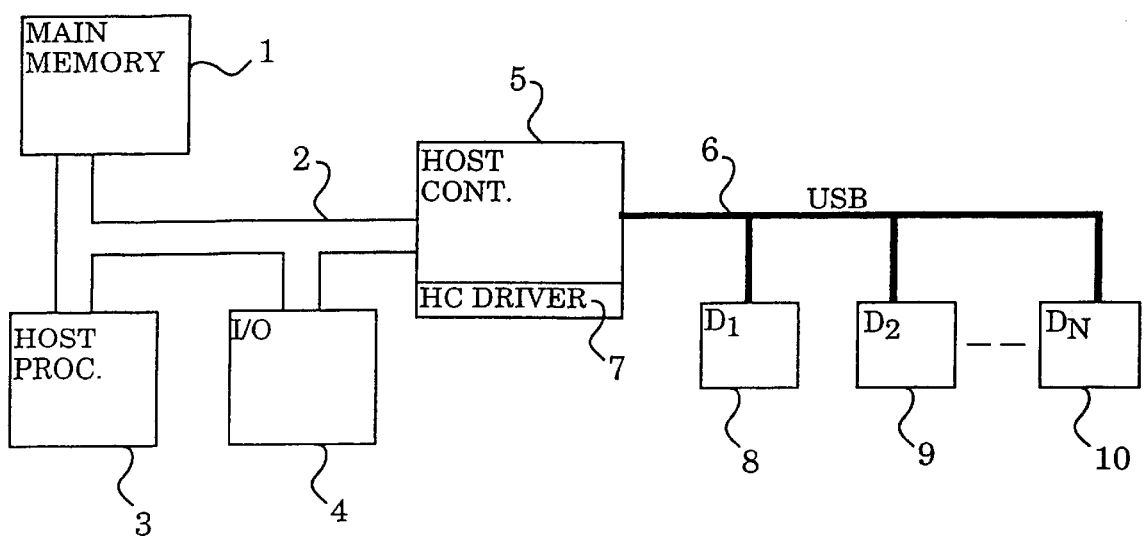
FIG. 3 shows a block diagram of a system for use with one embodiment of the invention.

FIG. 3 shows a block diagram of the system which may implement one embodiment of the invention. A main memory 1 is coupled to a system bus 2. The system bus 2 may be, for example, a PCI bus. A host processor 3 is also coupled to system bus 2. One or more I/O devices 4 may also be coupled to the system bus 2. A host controller 5 interfaces between system bus 2 and universal serial bus (USB) 6. Host controller driver 7 creates schedules of transactions to be conducted over the USB 6 in any particular frame. As discussed above, a frame is one millisecond (1 ms). Such transactions may be directed to any of the USB devices 8–10. Up to 126 USB devices may reside on the USB 6.

Host controller driver 7 is responsible for creating a frame schedule such that for a particular frame, isochronous and interrupt transactions (all of which must be completed in that frame) require no more than 90% of the frame time under worst case transmission characteristic assumptions. Ten percent of the frame time is guaranteed reserved for control transactions. If time is left over either because there were no isochronous or interrupt transactions allocated to the frame or because those transactions did not fill the frame, additional control and/or bulk transactions may occur. Similarly, if control transactions do not use their guaranteed 10% allocation, bulk transactions can occur during any remaining time. This is known as bandwidth reclamation.

Figure 4:
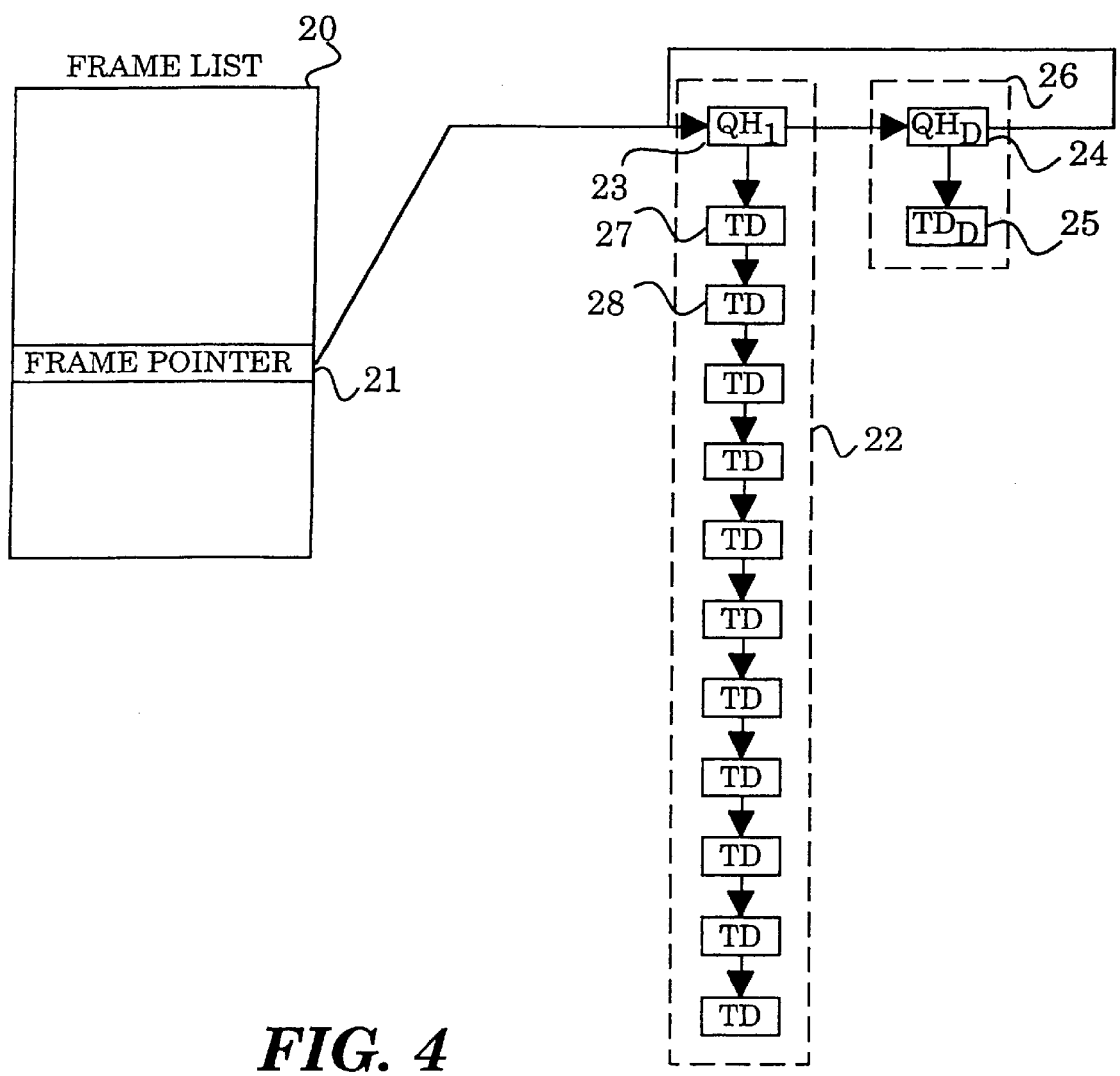
FIG. 4 shows a frame schedule of one embodiment of the invention.

Now referring to FIG. 4, which shows frame list 20 including frame pointer 21, as discussed above in connection with the prior art, a frame pointer points to a frame schedule for a particular frame. FIG. 4 shows a frame schedule in one embodiment of the invention. For illustration purposes, it has been assumed that no isochronous, interrupt or control transactions are scheduled for this frame. However, the described method can be applied anytime bandwidth reclamation occurs in a frame, and such is within the scope and contemplation of the invention. The schedule includes bulk queue context 22 with queue head (QH) 23 and ten transaction descriptors (TDs) linked thereto. The number of TDs has been arbitrarily selected from illustration only and the invention could equally be employed with larger or smaller number of TDs. Additionally, queue context 22 need not be a bulk queue context. It only needs to be reclaimable. Thus, the invention is applicable for control queue contexts as well. Host controller driver also schedules delay queue context 26 which includes delay QH 24 which is linked to delay TD 25.

In the following discussion, it is assumed that the ability of the USB device to accept data has been determined prior to entering the frame corresponding to frame pointer 21. How a device's ability is determined is discussed further below in connection with FIG. 7. In such case assuming, for example, the device pointed to by $QH_1$ 23, e.g., USB device 8 of FIG. 3, can only accept a single data transfer of 64 bytes in any frame, delay queue context 26 is used to reduce the drain on the system bus associated with the numerous useless arbitrations for transfers which cannot complete. Significantly, this embodiment requires no change to the host controller 5 from the prior art. In this example, QH 23 would be fetched from main memory 1. QH 23 would then be processed to identify TD 27. TD 27 would be fetched from main memory and the data it referenced would be transferred over the USB. An acknowledge would be returned from USB device 8 and the element link pointer of $QH_1$ 23 would be updated to point to TD 28.

Then, delay QH 24 would be read from main memory 1. Delay QH 24 points to a dummy device on the USB to which data will be sent. This reduces by one the number of real devices that can be attached to the USB. Delay QH 24 is processed to identify delay TD 25 which would in turn be fetched from main memory 1. It is envisioned that in one embodiment of the invention, TD 25 will be configured as an isochronous transfer with the data size of the isochronous transfer selected to use up the remainder of the frame time. Alternatively, if USB device 8 could accept, for example, two data transfers in a frame, the data size of the isochronous transfer descripted by delay TD 25 can be adjusted such that frame time remains to conduct the transfer descripted by TD 28. Effectively, the data size corresponding to TD 25 can be selected to achieve any desired delay within a frame. Adjusting the data size to achieve any desired delay is within the scope and contemplation of the invention. Use of a normal isochronous TD results in retirement of the TD after each transaction, therefore the host controller driver will likely want to link several isochronous TDs to the delay QH. If the isochronous transaction can be made persistent, e.g., indefinitely retriable, a single isochronous TD may be used. It the host controller accepts transaction of other types unconstrained by data length limits, e.g., 400 byte bulk transactions, other transaction types which can be limitlessly retried might be employed and thereby reduce some scheduling overhead.

As discussed in connection with the prior art, if delay queue context 26 were not present, the host controller would spin on QH 23. In the example where only data corresponding to a single TD can be successfully transferred in a frame, the system bus usage for the frame profile of the prior art would appear as: read $QH_1$ 23+read TD 27+read data for TD 27+acknowledge TD 27+17×(read $QH_1$ 23+read TD 28+read data TD 28+NAK TD 28). This implies approximately 68 useless arbitrations and 68 useless reads/writes of QH, TDs, and NAKs. Conversely, under this embodiment of the invention, the profile would be: read QH 23+read TD 27+read data TD 27+acknowledge TD 27+read QH 24+read TD 25+read data TD 25. This corresponds to a total of seven arbitrations, only three of which are "useless." The actual number of arbitrations may be increased depending on the possible data burst rate possible with a given host controller. If, e.g., the maximum burst rate is 64 bytes, the prior art arbitration profile would remain the same, but the arbitration's association with this embodiment of the invention would increase by the delay data size/64 bytes. Nevertheless, significantly fewer arbitrations are required than in the prior art. Additionally, while the same amount of useless data is read from main memory in either case, the number of arbitrations are reduced, the number of QHs and transaction descriptors read are reduced, and the data for the isochronous transfer can be retrieved more efficiently as it can be streamed as one large block rather than numerous small bursts (this assumes bursting ability of greater than 64 bytes of data per burst). This will result in a significant reduction in overall system bus bandwidth wasted on transactions that cannot complete.

This is particularly true in the case of, for example, a PCI bus on which no data can flow while arbitration is taking place and which support streaming such that larger blocks of data move more efficiently over the bus. Basically, PCI bus transactions are broken down into an arbitration phase, an address phase, and a data phase. One of ordinary skill in the art will recognize the throughput benefit to the system bus of doing one large transaction rather than numerous small transactions even where the total data transferred is the same.

Figure 5:
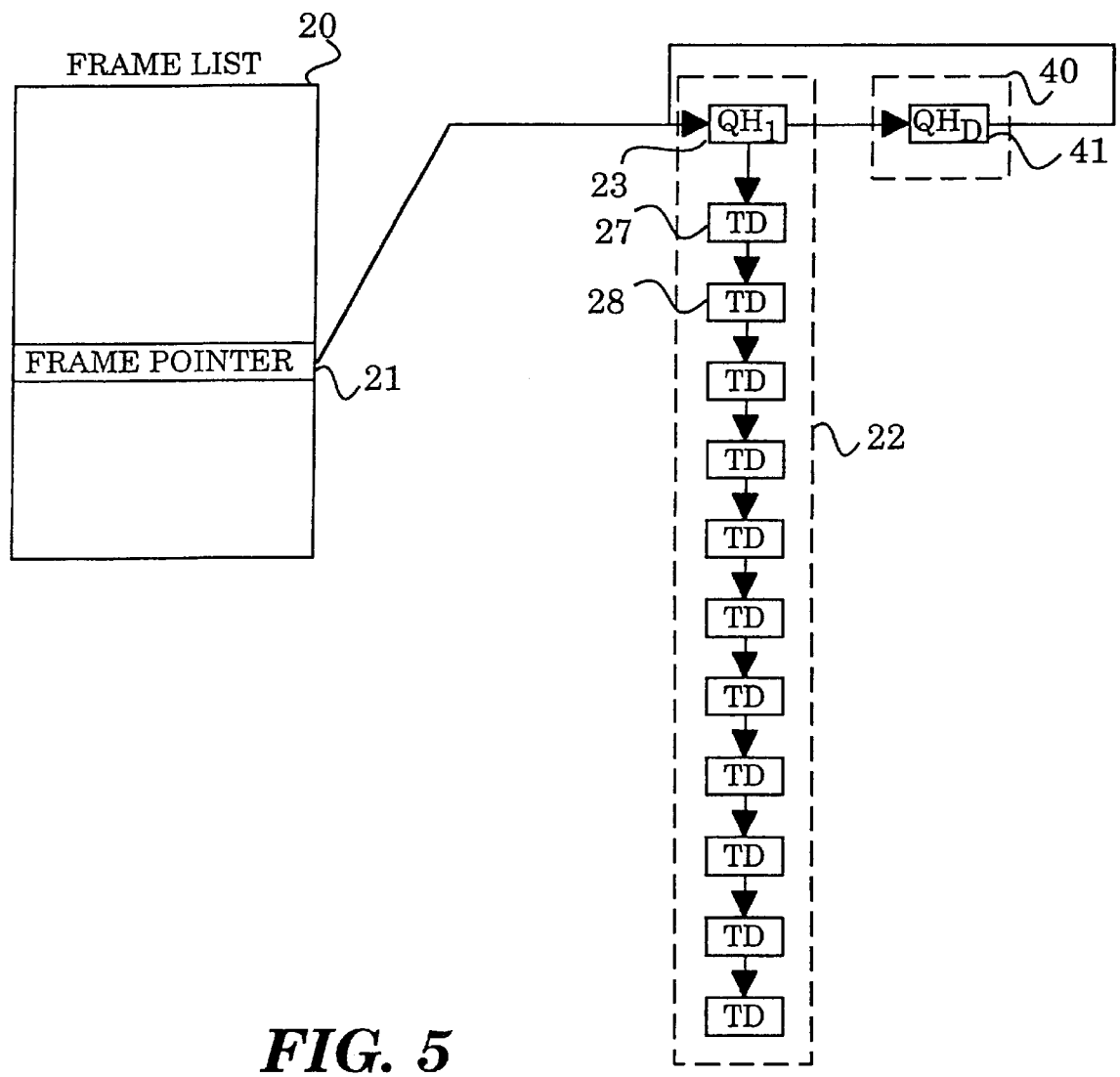
FIG. 5 shows a frame schedule of an alternative embodiment of the invention.

FIG. 5 shows a schedule of an alternative embodiment of the invention. In this schedule, the same bulk queue context 22 contains QH 23, which in turn points to delay QH 41 which is delay queue context 40. Rather than being linked to a TD, the delay QH 41 is identified as a delay QH and, as such, the link element field of the QH is used to contain a count value. FIG. 9 shows an example format for such a delay QH. Alternatively, delay QH 41 could point to a modified TD or other data structure containing a count value. Based on the count value, the host controller 5 counts down that count value before looping back to perform another transfer from queue context 22. This will require minimal hardware modification of the host controller 5 as the QHs currently contain reserved bits which could be used to identify the QH as a delay QH (in FIG. 9, a "01" in reserved bits 3 and 4 indicate a delay type QH), and the host controller 5 already maintains a count based on bus cycles for framing purposes. Thus, this down count value supplied by QH 41 can effectively result in the delay where the number of USB cycles for the byte count value of the count value dictates the delay time. Accordingly, any desired number of cycles can be inserted between attempted transfers from queue context 22. This eliminates the system bus bandwidth drain associated with transferring the delay data and eliminates the additional transfer of the delay TD 25 of the embodiment described as reference to FIG. 4. It also eliminates the required reserved address, thereby making all 126 addresses available for real USB devices.

Figure 6:
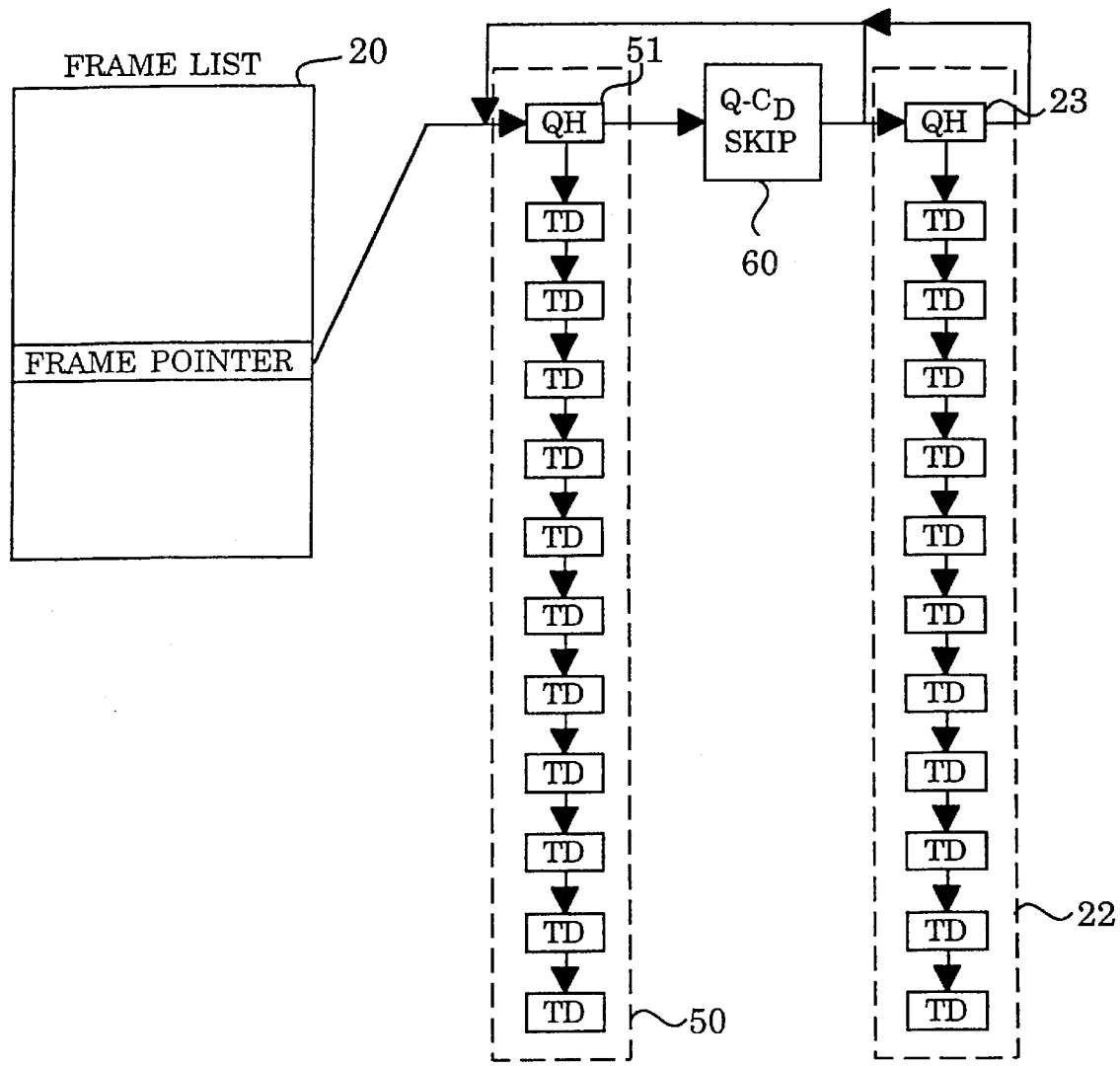
FIG. 6 shows a frame schedule of a second alternative embodiment of the invention.

FIG. 6 shows a schedule containing two bulk queue contexts 22 and 50 and a skip queue context 60. In this embodiment, queue context 22 is presumed to correspond to a slow device where slow device is defined to be a device which cannot handle data at the rate which the host controller can supply the data over the USB. Queue context 50 is presumed to correspond to a faster USB device which could be any speed up to the maximum data transfer rate of the USB. Delay queue context (not shown) may be used in addition to the skip queue context 60 and can take the form of either delay queue context 40 or delay queue context 26 of FIGS. 4 and 5, respectively. This embodiment is designed to accommodate the situation where there are multiple queue contexts corresponding to different devices of different speeds because there is otherwise a trade-off between throttling the USB to the speed of the slowest device, thereby undercutting the throughput possible on the faster device or squandering system bus bandwidth.

The schedule shown in FIG. 6 contemplates a queue context 60 to throttle USB transfers that correspond to the slower USB device. The format of one example of a skip QH is shown in FIG. 9 in which a "10" in the reserved bits indicate a skip type queue context. Queue context 60 holds a skip count value. The skip count is used to skip queue context 22 until skip count is zero. When skip count is zero, skip count is reloaded from skip reload field 63. If skip count is not zero, a pointer to QH 51 is followed, and transfers continue from queued context 50. Of course, if the faster device is less than full speed, delays may be introduced as discussed above to avoid wasting system bus bandwidth on the faster device. Accordingly, queue context 60 causes a loop back to read of QH 51 at the rate at which a corresponding device can receive data transfers. When the skip count reaches a predetermined value, the skip queue context 60 points on to a next transfer corresponding to queue context 22. One way in which this embodiment might be affected is to use a link element pointer of the skip QH to point to queue context 22 and use the QH link pointer to point to queue context 50 (as shown in FIG. 9). In this manner, throughput of the faster device is not undermined, while bus bandwidth is also not squandered on unnecessary arbitrations and transfers with no hope of completion.

In the embodiment shown in FIG. 9, the skip count field 62 is two bits wide, and the reload field 63 is two bits wide. It is believed that for nearly all cases, these two bit fields should be sufficient for the skip count value. Skip queue head could be cascaded to achieve any desired delay. One of ordinary skill would understand how this example may be expanded to N-bulk queue contexts, and such is within the scope and contemplation of the invention.

In an alternate embodiment, the host controller driver would be required to maintain the reload values for all skip queue heads and reload the count value after time out. This would allow for a four bit skip count field by combining the skip count field 62 with the reload field 63 of FIG. 9.

Figure 7:
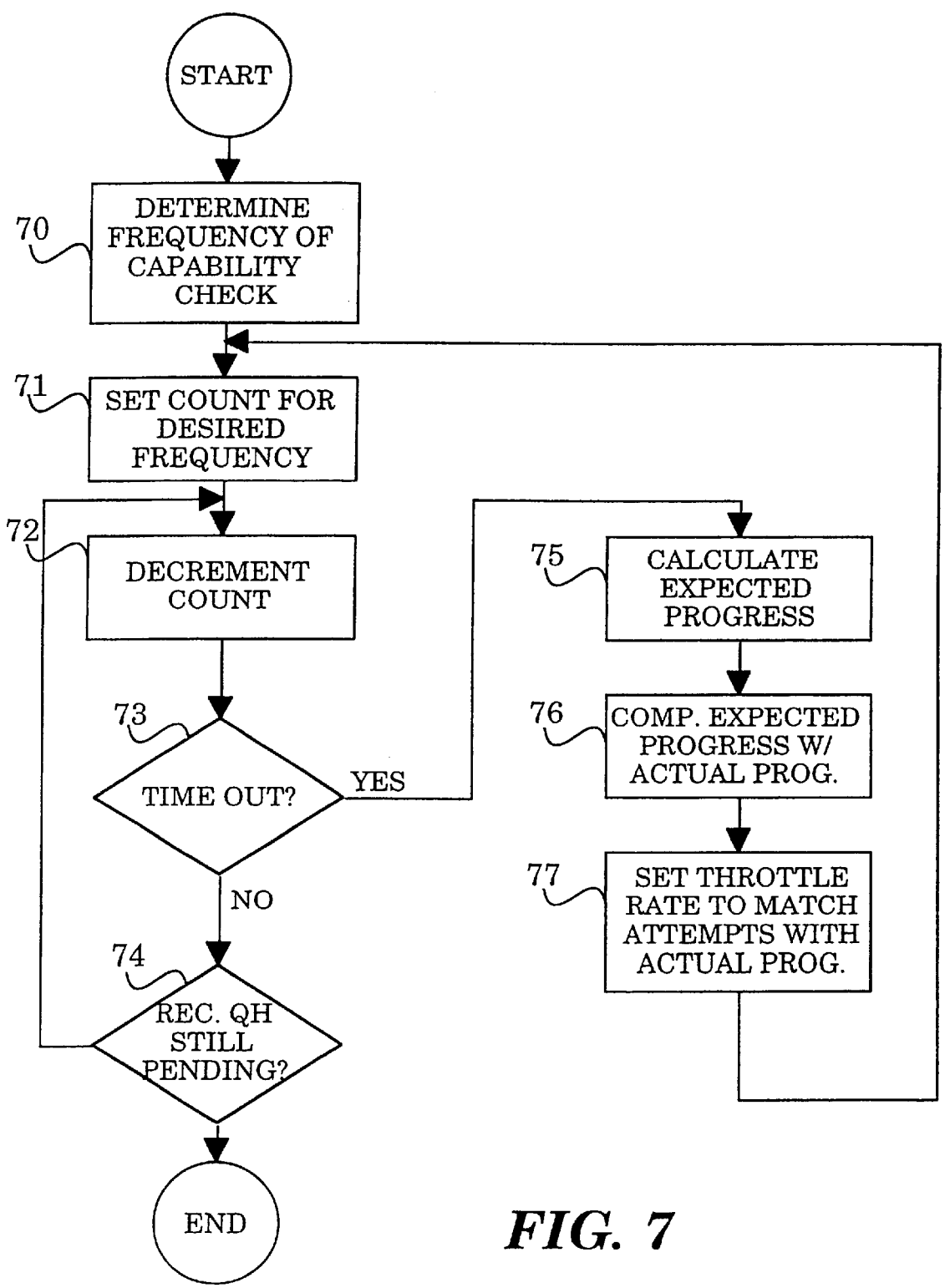
FIG. 7 shows a flowchart of determining device capability in one embodiment of the invention.

FIG. 7 shows a flowchart of determining the capability of a device in one embodiment of the invention. At functional block 70, a determination is made as to what frequency is desirable to check the capability of USB devices. The host controller driver is responsible for creating frame schedules. It, therefore, knows the time allotted during a series of frames to bulk or control transfers. The host controller driver could maintain a count and check, e.g., every tenth frame when bulk transaction transfers are pending. At functional block 71, a count is set for the desired frequency. At functional block 72, the count is decremented. At decision block 70, it is determined whether a time-out condition has thereby resulted. If not, at decision block 72, a determination is made if there is still a reclaimable QH pending. If there is, the count is again decremented at functional block 72, and the process continues. If not, the process ends.

If at decision block 73 a time-out has occurred, at functional block 75, the expected progress for the pending reclaimable QHs is calculated. In one embodiment, this takes the form of the host controller driver monitoring the time available for bulk transfers during a predetermined time interval, and calculating an expected progress through a queue context in that interval. The expected progress is based on transfers at the maximum rate allowed by USB. At functional block 76, actual progress is then compared with expected progress over that time interval and a reasonably good approximation of the speed at which the device can accept data transfers is determined.

Based on these device capabilities, a throttle rate is established to more closely match attempts to transmit data to the device with the device's actual progress. This occurs at functional block 77. Then the count for desired frequency is reset, and the process continues.

In determining device capabilities, one can assume that the device's ability to accept data is either constant over time or time varying. If constant after the first determination of capability for a particular device, no further determination need be made for that device. Otherwise, establishing a look rate at an adequately long interval, e.g., every 10 ms, so as not to excessively increase overhead associated with the determination is desirable. In an alternative embodiment, the USB devices could be required to inform the host controller of their maximum rate of transfer or acceptance ability. However, this is not currently required of USB devices.

Regardless of how the device's capabilities are determined, based on that determination, the host controller driver creates a delay queue context (or modifies a previously created delay queue context) and inserts it into the frame schedule at functional block 77 as previously discussed. The data transfer or count of the delay queue context is selected appropriately based upon the expected time in that schedule for bulk transfers and the capability of the device just determined. For example, if based on the isochronous and interrupt transfer schedule for that frame only 30% of the time expected to remain for bulk transfers, it would be inappropriate to schedule a delay queue transfer or delay queue count which exceeds 30% less the time required for one bulk transfer.

Figure 8:
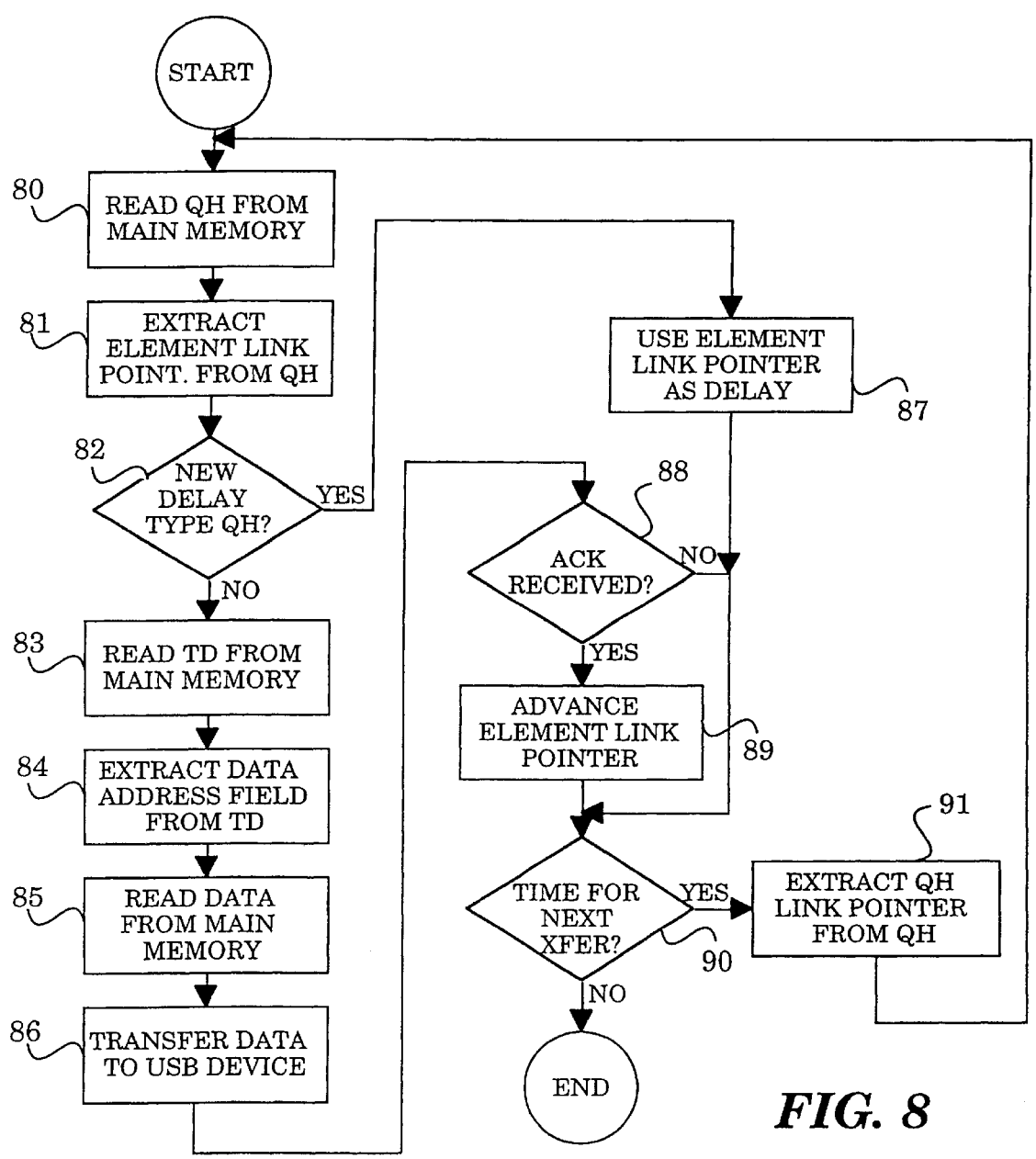
FIG. 8 shows a flowchart of operation of reclaimable transactions in one embodiment of the invention.

FIG. 8 shows a flowchart of how reclaimable transactions proceed in a system employing one embodiment of the invention. At functional block 80, a QH is read from main memory, and the element link pointer is extracted from the QH at functional block 81. The reserve bit field is checked to determine if it is a new delay-type QH at decision block 82. If it is not a new delay-type QH, i.e., it is a QH of the form of the prior art, a TD is read from main memory at functional block 83. At functional block 84, the data address field is extracted from the TD. At functional block 85, the data is read from main memory, and at functional block 86, the data is transferred to the USB device. At decision block 88, a determination is made whether an acknowledge has been received. If it has, at functional block 89, the element link pointer is advanced. If the new delay type QH is found to exist at decision block 82, the element link pointer is used as a delay at functional block 87. Either after execution of functional block 87 or at functional block 89, a determination is made if there is time for another transfer at decision block 90. If there is sufficient time for an additional transfer at functional block 91, the QH link pointer is extracted from the QH and followed to initiate a read of another QH back at functional block 80. If there is insufficient time for another transfer, the process ends.

The above description has been nearly uniformly conducted in the context of a bulk transfer from the host to the USB device. One of ordinary skill in the art will understand that analogous benefit is achieved by employing the invention with bulk transactions in which the USB is providing the data as well as with reclaimable control transfers in either direction. Accordingly, the invention is intended to include such transfers within its scope.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of reducing system bus load due to universal serial bus (USB) bandwidth reclamation comprising:

conducting one of a bulk and control data transfer over a USB wherein a slow device is one of a provider and a recipient of a data to be transferred; and throttling a USB host controller to attempt to transfer the data at a rate consistent with an ability of the slow device to one of provide and receive the data.

2. The method of claim 1 wherein the slow device is a full speed device.

3. The method of claim 1 further comprising:

empirically determining the ability of the slow device to provide or receive data.

4. The method of claim 3 wherein empirically determining comprises:

conducting a first transfer and second transfer of data over the USB at a transfer rate;

reducing the transfer rate if either transfer is not successful;

conducting two transfers at a then current rate; and repeatedly reducing and conducting until both transfers are successful.

5. A system comprising:

a system bus;

a main memory coupled to the system bus;

a universal serial bus (USB);

a host controller providing an interface between the system bus and the USB;

a device on the USB which receives data from the main memory through the host controller; and a host controller driver that creates a delay data structure to reduce a rate of attempted data transfers to the device when the device cannot receive data at a rate at which the host controller can supply data.

6. The system of claim 5 wherein the delay data structure comprises a queue head containing an element link pointer pointing to a delay transaction descriptor.

7. The system of claim 6 wherein the delay transaction descriptor is an isochronous transaction descriptor.

8. The system of claim 5 wherein the delay data structure comprises a queue head containing a count value indicating a length of time the host controller should wait before attempting a next transaction.

9. The system of claim 6 wherein the delay transaction descriptor is one of a bulk transaction descriptor and a control transaction descriptor.

10. The system of claim 7 wherein the isochronous transaction descriptor is retriable.

11. The system of claim 9 wherein the delay transaction descriptor has an associated data size unlimited by the transaction type.

* * * * *

UNITED STATES PATENT AND TRADEMARK OFFICE
CERTIFICATE OF CORRECTION

PATENT NO. : 6,349,354 B1
DATED : February 19, 2002
INVENTOR(S) : Garney

It is certified that error appears in the above-identified patent and that said Letters Patent is hereby corrected as shown below:

Column 6,
Line 13, delete "It", insert -- If --.

Signed and Sealed this

Twenty-seventh Day of August, 2002

Attest:

Attesting Officer

JAMES E. ROGAN
Director of the United States Patent and Trademark Office